US 11,448,878 B2

(12) United States Patent
Hoshino et al.

(10) Patent No.: US 11,448,878 B2
(45) Date of Patent: Sep. 20, 2022

(54) HEAD UP DISPLAY

(71) Applicant: Maxell, Ltd., Kyoto (JP)

(72) Inventors: Shigeki Hoshino, Kyoto (JP); Hidemi Yamada, Kyoto (JP); Toshinori Sugiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/277,318

(22) PCT Filed: May 17, 2019

(86) PCT No.: PCT/JP2019/019797
§ 371 (c)(1),
(2) Date: Mar. 18, 2021

(87) PCT Pub. No.: WO2020/059206
PCT Pub. Date: Mar. 26, 2020

(65) Prior Publication Data
US 2021/0349311 A1    Nov. 11, 2021

(30) Foreign Application Priority Data

Sep. 20, 2018  (JP) .............................. JP2018-175856

(51) Int. Cl.
*G02B 27/01*  (2006.01)
*B60K 35/00*  (2006.01)
(Continued)

(52) U.S. Cl.
CPC .......... *G02B 27/0101* (2013.01); *B60K 35/00* (2013.01); *G02B 5/10* (2013.01);
(Continued)

(58) Field of Classification Search
CPC .................. G02B 27/0101; G02B 5/0284; G02B 5/0263; B60K 35/00; B60K 2370/1529
See application file for complete search history.

(56) References Cited

FOREIGN PATENT DOCUMENTS

JP    2012-58690 A    3/2012
JP    2017-3897 A     1/2017
(Continued)

OTHER PUBLICATIONS

International Search Report and Written Opinion dated Aug. 6, 2019, received for PCT Application PCT/JP2019/019797, Filed on May 17, 2019, 7 pages including English Translation.

*Primary Examiner* — Ryan D Howard
(74) *Attorney, Agent, or Firm* — Xsensus LLP

(57) ABSTRACT

A head up display that projects a video onto a windshield of a transportation, thereby displaying a virtual image related to the video to a driver, the head up display including a video display device including a light source and a display element and configured to form the video, and video light projecting means configured to project and reflect a video light emitted from the video display device on the windshield, thereby displaying the virtual image in front of the transportation, the video light projecting means including a reflection mirror that reflects the video light emitted from the video display device to the windshield, and the reflection mirror including, on its outer peripheral portion, deflection means configured to direct a reflected light in a direction different from a direction toward a line of sight of the driver.

12 Claims, 8 Drawing Sheets

(51) Int. Cl.
 *G02B 5/10* (2006.01)
 *H04N 9/31* (2006.01)
(52) U.S. Cl.
 CPC .......................... *B60K 2370/1529* (2019.05);
  *B60K 2370/736* (2019.05); *H04N 9/3141*
  (2013.01)

(56) References Cited

FOREIGN PATENT DOCUMENTS

| | | | | |
 |---|---|---|---|---|
 | JP | 2018-083593 A | 5/2018 | | |
 | JP | 2018-128538 A | 8/2018 | | |
 | WO | WO-2017208961 A1 | * | 12/2017 | ............. B60K 35/00 |
 | WO | 2018/142471 A1 | 8/2018 | | |

* cited by examiner

FIG. 3
(a)
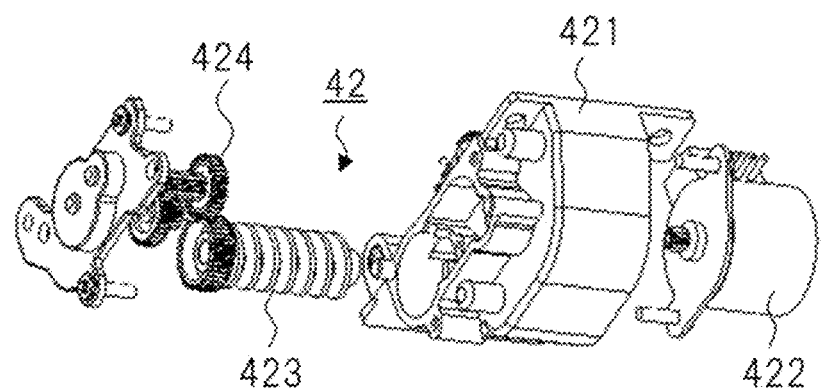
(b)
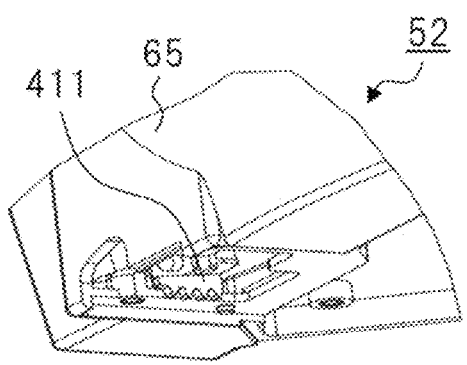
(c)
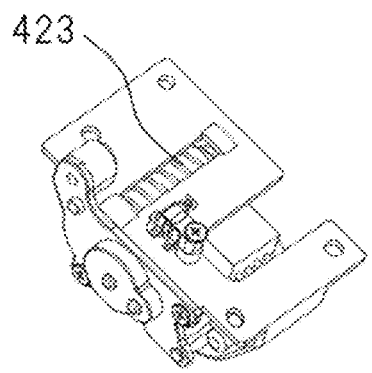

FIG. 7
(a)
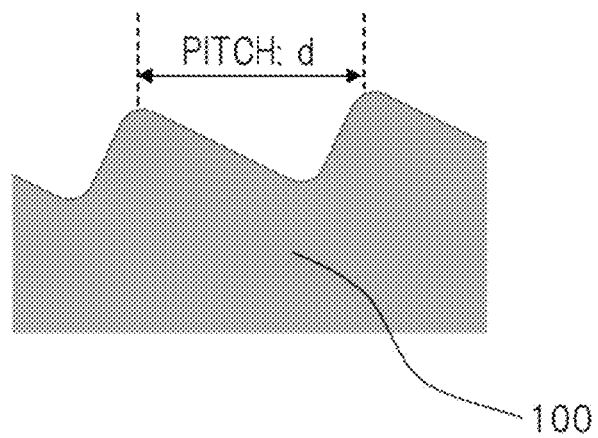
(b)
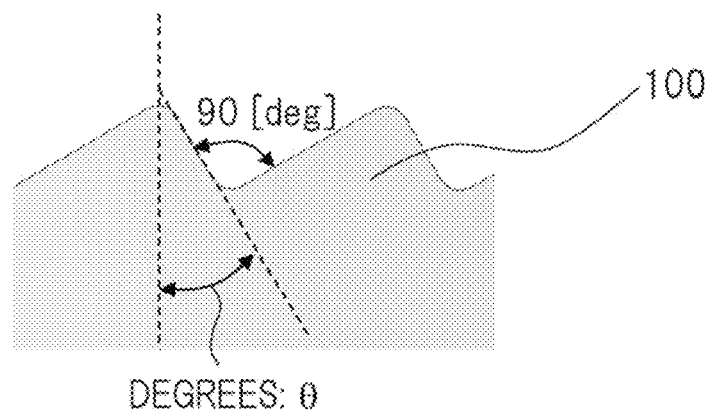

FIG. 8
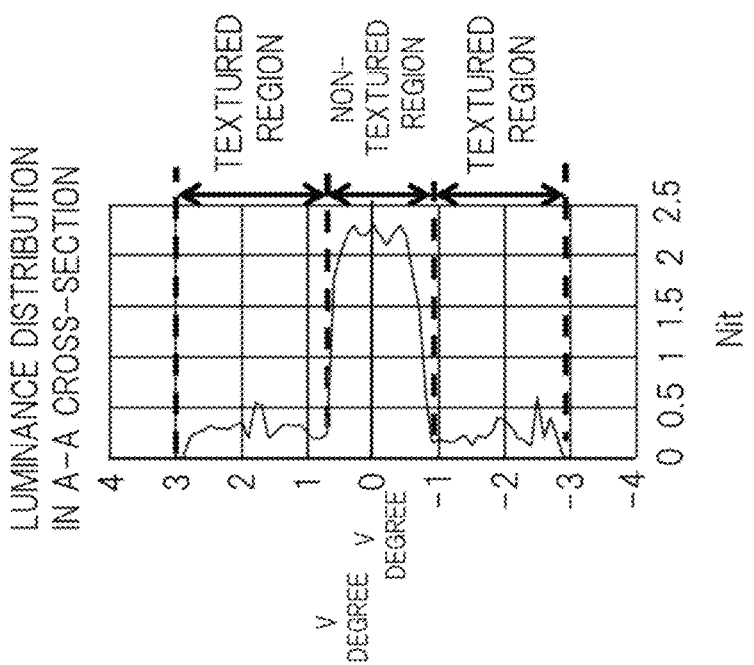
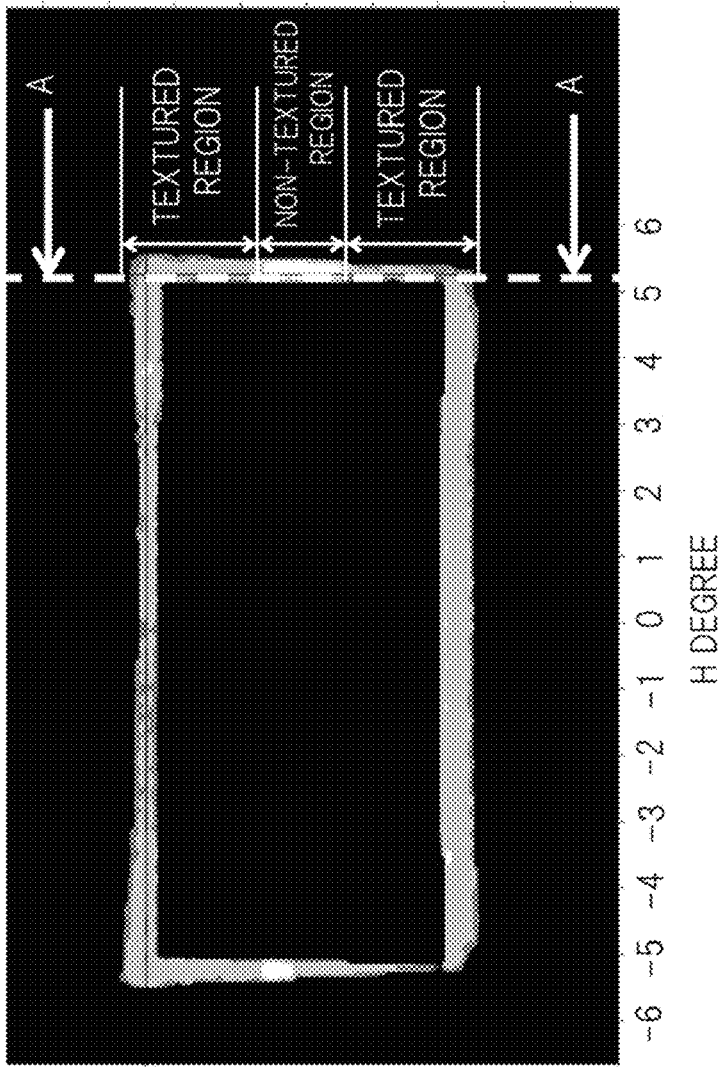

HEAD UP DISPLAY

CROSS-REFERENCE TO RELATED APPLICATIONS

The present application is based on PCT filing PCT/JP2019/019797, filed May 17, 2019, which claims priority to JP 2018-175856, filed Sep. 20, 2018, the entire contents of each are incorporated herein by reference.

TECHNICAL FIELD

The present invention relates to a technology of a head up display, and particularly relates to a technology effectively applied for better information display by taking measures for astray light such as a reflected light from a mirror constituting the device.

BACKGROUND ART

In vehicles such as automobiles, information such as vehicle speed and engine speed is usually displayed on an instrument panel in a dashboard. In addition, a screen of a car navigation system or the like is built in the dashboard or is displayed on a display installed on the dashboard. Since it is necessary for a driver to move the line of sight significantly when visually recognizing the information, the head up display (referred to also as "HUD") which projects and displays information such as vehicle speed and information related to car navigation on a front glass (referred to also as "windshield") or the like has been known as a technology for reducing the amount of movement of the line of sight.

As a technology related to the suppression of light reflection in the HUD like this, for example, a device according to the following Patent Document 1 has already been known. Specifically, in this device, a light shielding portion formed so as to overlap an opening through which emitted video light passes is provided in a part of an upper case of a case that can be divided into the upper case and a lower case in order to house a light emission device therein, and a low reflection coating is applied to the light shielding portion and its surroundings in order to prevent the reflection of a part of the light shielded by the light shielding portion onto a projection surface such as the windshield.

RELATED ART DOCUMENTS

Patent Documents

Patent Document 1: Japanese Unexamined Patent Application publication No. 2017-3897

SUMMARY OF THE INVENTION

Problems to be Solved by the Invention

However, although it is possible to obtain a certain effect by applying the low reflection coating to a part of the device and its surroundings according to the prior art technology mentioned above, the cost for coating is needed. Further, as will be described in detail below, according to the study by the inventors, there is a problem that, particularly when a backlight of the HUD is lit or an external light enters, a part of the light is reflected on an outer peripheral portion of a reflection mirror (concave mirror) constituting the HUD and becomes stray light, so that the quality of the virtual video displayed by the device is deteriorated.

Therefore, an object of the present invention is to provide a head up display excellent in practicality capable of displaying high-quality virtual video by preventing or suppressing the decrease in video quality due to the reflected light entering from an outer peripheral portion of the reflection mirror (concave mirror) into the projection image light that forms a virtual image.

When a typical embodiment of the present invention is simply described, a head up display configured to project a video onto a windshield of a transportation, thereby displaying a virtual image related to the video to a driver is provided, and the head up display comprises: a video display device including a light source and a display element and configured to form the video; and video light projecting means configured to project and reflect a video light emitted from the video display device on the windshield, thereby displaying the virtual image in front of the transportation, wherein the video light projecting means includes a reflection mirror configured to reflect the video light emitted from the video display device to the windshield, and wherein the reflection mirror includes, on its outer peripheral portion, deflection means configured to direct a reflected light in a direction different from a direction toward a line of sight of the driver.

Effects of the Invention

An effect obtained by the typical embodiment of the present invention will be described as follows. Namely, according to a typical embodiment of the present invention, it is possible to display the high-quality virtual video because the decrease in video quality due to the reflected light entering from an outer peripheral portion of the reflection mirror (concave mirror) into the projection image light that forms a virtual image can be prevented or suppressed, so that the head up display capable of displaying excellent video information to a person who sees the video such as a driver can be achieved.

BRIEF DESCRIPTIONS OF THE DRAWINGS

FIG. 3 is a developed perspective view schematically showing an example of a configuration of a mirror drive unit of the HUD;

FIG. 7 is a partially enlarged cross-sectional view showing a specific shape of the texture; and FIG. 8 is a diagram showing a measurement result obtained by the reflection mirror (concave mirror) having the above-mentioned texture.

DETAILED DESCRIPTION OF PREFERRED EMBODIMENT

Hereinafter, an embodiment of the present invention will be described in detail with reference to drawings. Note that the same components are denoted by the same reference signs in principle throughout the drawings for describing the embodiment, and the repetitive description thereof will be omitted. Meanwhile, a component that has been attached with a reference sign and described with reference to a certain drawing is sometimes referred to with the same reference sign in the description of other drawings though not illustrated again. Further, in the following embodiment, the case where the head up display (HUD) is installed in a vehicle such as an automobile will be described as an example, but the present invention can be applied to other transportations such as a train and an airplane. Further, it is also possible to apply the present invention to the HUD designed for the purposes other than the transportations.

Figure 1:
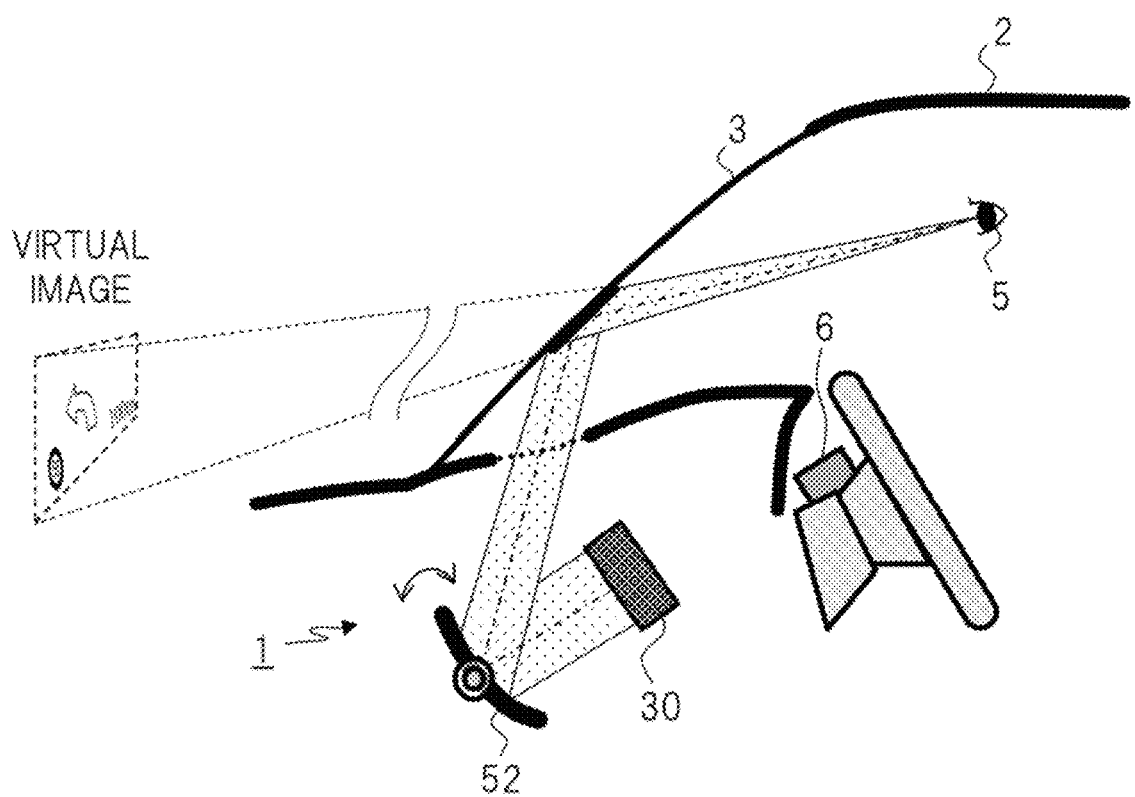
FIG. 1 is a diagram schematically showing an example of an overall configuration of a HUD according to an embodiment of the present invention.

FIG. 1 is a diagram schematically showing an example of an overall configuration of a head up display according to an embodiment of the present invention. In a HUD 1 according to this embodiment, a video light displayed by a video display device 30 arranged in a housing (not shown) or at a position where it is detachably attached to the housing is reflected by a reflection mirror (concave mirror) 52 through a necessary optical element (for example, folding mirror (not shown)), and is projected onto a windshield 3 of a vehicle 2.

Here, the member to which the video light is projected is not limited to the windshield 3, and any member such as a combiner may be applied as long as the video can be projected to the member. Further, the video display device 30 is composed of, for example, a projector or an LCD (Liquid Crystal Display) having a backlight. It may be a self-luminous VFD (Vacuum Fluorescent Display) or the like. A system in which a projection device displays a video on a screen is also applicable. Such a screen may be configured by, for example, a microlens array in which microlenses are two-dimensionally arranged.

The reflection mirror 52 is held by a mirror holder 521 (FIG. 2), and is composed of, for example, a free-form curved mirror, a reflection mirror having a shape asymmetrical with respect to an optical axis, or the like. More specifically, as to the surface shape of the reflection mirror 52, for example, in order to reduce the distortion of the virtual image, the radius of curvature is relatively reduced in an upper region so as to increase the magnification factor (namely, the light ray reflected here is reflected on a lower portion of the windshield 3, and thus the distance from the viewpoint of a driver 5 becomes relatively short). On the other hand, the radius of curvature is relatively increased in a lower region of the reflection mirror 52 so as to reduce the magnification factor (namely, the light ray reflected here is reflected on an upper portion of the windshield 3, and thus the distance from the viewpoint of the driver 5 becomes relatively long). Further, it is also possible to reduce the generated distortion itself by correcting the difference in image magnification described above by arranging the video display device 30 so as to be inclined with respect to the optical axis of the reflection mirror 52.

The driver 5 sees the video projected onto the windshield 3, thereby visually recognizing the video as a virtual image in front of the vehicle through the transparent windshield 3. The display position of the virtual image seen by the driver 5 may be adjustable in the vertical direction by adjusting the angle of the reflection mirror 52 to adjust the position of projecting the video onto the windshield 3. Note that the content to be displayed as the virtual image is not particularly limited, and for example, vehicle information, navigation information, and a video of the scenery in front taken by a camera (surveillance camera, around viewer, etc. (not shown)) may be displayed as appropriate.

Further, a reference sign 6 in the drawing is a camera such as an infrared camera attached to a part of a steering wheel, and it here constitutes means for detecting the viewpoint of the driver. Note that the camera serving as the viewpoint detecting means does not necessarily have to be attached to a part of the steering wheel as described above, and it is only required to be able to detect the viewpoint of the driver. For example, it can be attached to a part of the dashboard or a part of the windshield 3.

Figure 2:
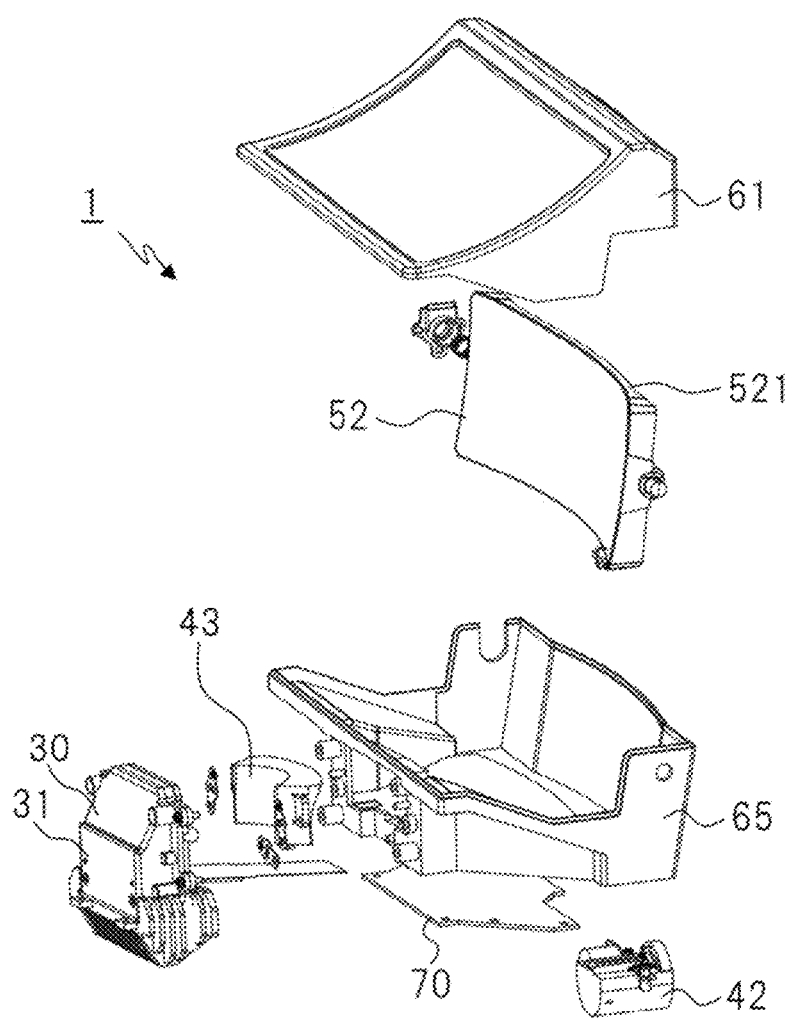
FIG. 2 is a developed perspective view showing an example of a detailed configuration of a mounting form of the HUD.

Subsequently, FIG. 2 shows the internal structure of the HUD 1 in detail. Here, the housing described above is denoted by reference signs 61 and 65, and the video display device 30 is configured to include, for example, a backlight element (unit) 31 that is composed of a light emitting diode or the like serving as a light emitting element arranged on a plate and generates a self-luminous planar light and the above-described optical elements. Further, a distortion correction lens 43 as another necessary optical element is shown here.

As is clear from this drawing, in this example, the reflection mirror 52 is arranged inside the housings 61 and 65 in a state where it can be rotated within a small angle range by an axis formed as a pair on side surfaces. Further, at the bottom of the lower housing 65, a mirror drive unit 42 composed of a moving mechanism including a motor, a worm gear, a wheel, and the like is attached by an attachment/detachment mechanism such as a screw together with a main board 70 on which a control unit or the like is mounted. Namely, the mirror drive unit 42 makes it possible to adjust the inclination angle of the above-mentioned reflection mirror (concave mirror) 52 within the small angle range.

Subsequently, FIG. 3 is a diagram schematically showing a mounting example of the mirror drive unit 42 for changing the inclination angle of the reflection mirror 52. Here, as shown in FIG. 3(a), the mirror drive unit includes at least an electric motor 422 whose rotation speed can be controlled within a wide range from a high-speed rotation to a low-speed rotation, a worm gear 423, and a plurality of gears 424 installed between an output shaft of the motor and the worm gear in a case 421. Further, FIG. 3(b) shows a part of the reflection mirror 52 and the assembled mirror drive unit 42, and FIG. 3(c) is a perspective view showing the assembled mirror drive unit 42 of FIG. 3(a) seen from an angle different from that of FIG. 3(b). As shown in FIG. 3(b), the mirror drive unit 42 is attached to a lower end portion of the housing 65 such that the worm gear 423 meshes with a worm wheel 411 formed in a lower end portion of the reflection mirror 52 through a cutout portion shown in FIG. 3(c).

In the configuration of the mirror drive unit 42 described above, the rotation of the electric motor 422 capable of rotation control in a wide range from a low speed to a high speed is converted into a desired rotation speed/driving force via a plurality of gears 424 and is transmitted to the worm gear 423, so that the reflection mirror 52 is moved in a front-back direction (see an arrow in FIG. 1) while being rotated about the rotation axis by the worm wheel 411 formed in the lower end portion of the reflection mirror 52, thereby adjusting the reflection mirror 52 to the desired inclination angle.

<Reflection Mirror (Concave Mirror)>

Figure 4:
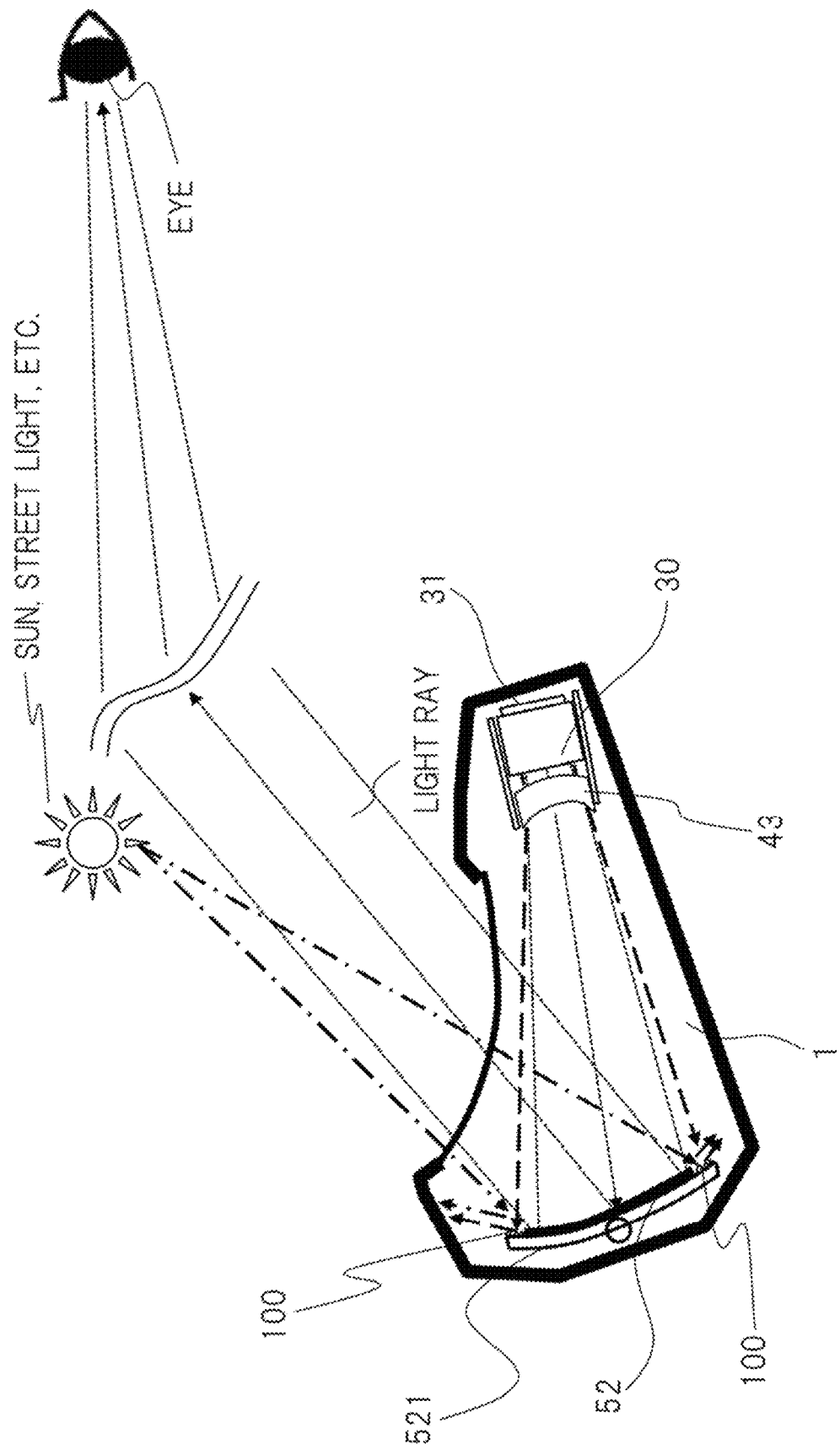
FIG. 4 is an explanatory diagram of an operation principle of a reflection mirror (concave mirror) in the HUD of the present invention.

Subsequently, the reflection mirror (concave mirror) 52 in the HUD 1 whose overall configuration is shown in FIG. 4 basically reflects the video light from the video display device 30 and projects it onto the windshield 3 of the vehicle 2 as described above. However, according to the result of the study by the inventors, particularly when the light (backlight light) from a backlight element which is a light emitting unit of the device and further a light from the outside of the vehicle (for example, direct light from the sun, scattered light, and external light such as a street light) enter as shown in FIG. 4, the incident light is reflected by the outer peripheral portion of the reflection mirror (concave mirror) 52 and the reflected light enters the displayed video depending on the situation, so that the quality of the virtual video displayed to the driver is deteriorated.

Thus, in the HUD 1 in which a virtual image is displayed by directing the video light toward the driver's eyes (in the line of sight) in principle, even if the incident light is reflected by the outer peripheral portion of the reflection mirror 52 when the back light is lit or the external light enters, the decrease in the quality of the displayed video can be effectively prevented/suppressed by directing (deflecting) the reflected light in the direction other than the direction toward the driver's eyes (in the line of sight), and the means for it is proposed in the present invention.

Figure 5:
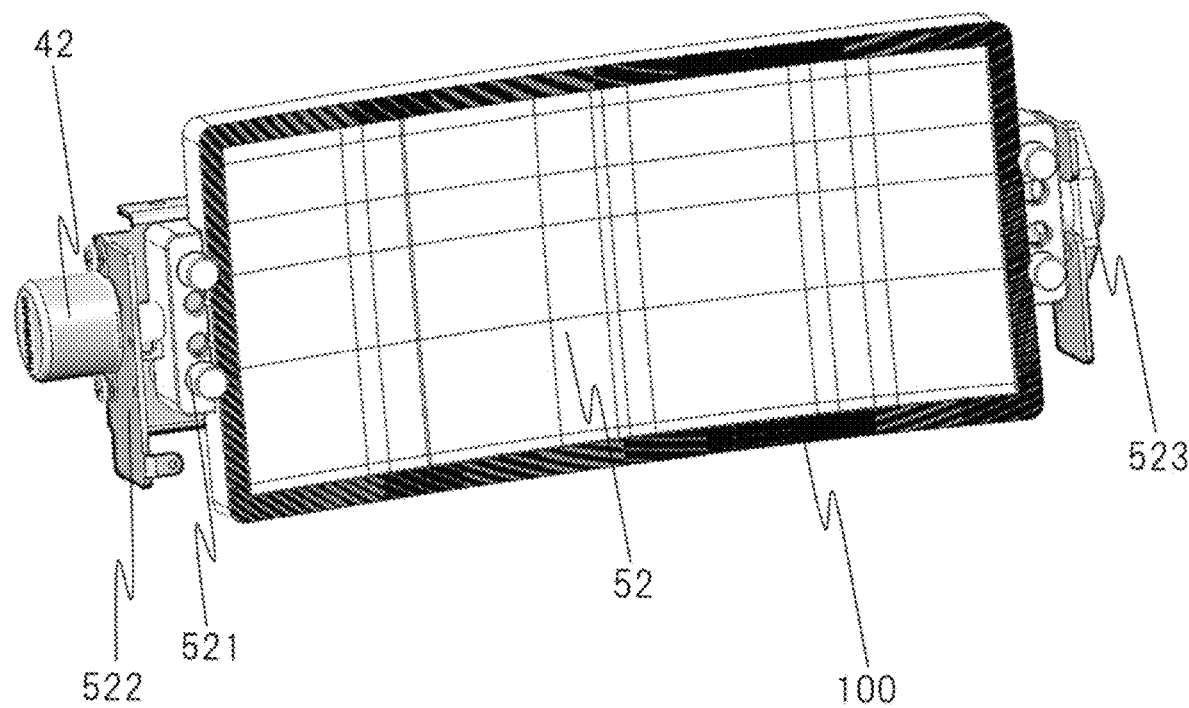
FIG. 5 is a perspective view showing a detailed structure of the reflection mirror (concave mirror) in the HUD.

More specifically, as the means for it, a texture 100, which will be described in detail below, is formed on the outer peripheral portion of the reflection mirror (concave mirror) 52 constituting the HUD 1 or on a surface of a portion of the mirror holder 521, which is a holding member thereof, adjacent to the outer peripheral portion of the mirror as shown in FIG. 5. For comparison, the application of the low-reflection coating according to the prior art is effective, but the cost for coating is needed, and the emboss processing cannot obtain sufficient effect for reducing the reflected light entering in the displayed video because the incident light is irregularly reflected on the embossed surface. Note that reference signs 522 and 523 in the drawing denote a mounting stay and a holding bush, respectively.

Figure 6:
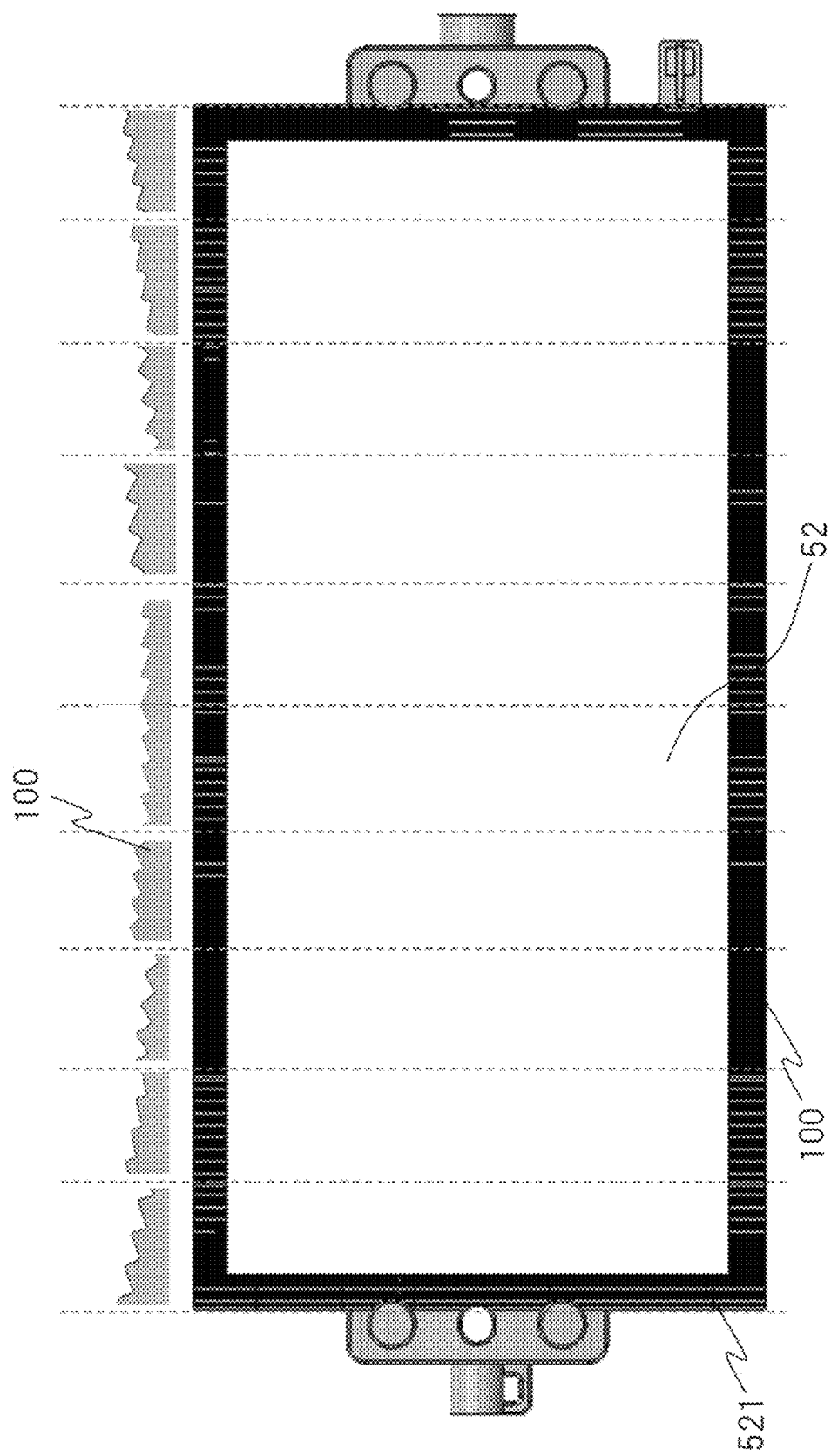
FIG. 6 is a diagram showing a structure of a texture in the reflection mirror (concave mirror)

Further, according to the study by the inventors, since the reflection mirror (concave mirror) 52 to be used in the HUD 1 has a free-form curved surface, the effect of reducing the stray light can be increased by forming the texture 100 with a metal mold and changing the (cross-sectional) shape of the texture 100 in accordance with the shape of the free-form curved surface of the reflection mirror 52. For example, as shown in the enlarged view of the cross section of each portion along the upper side of the reflection mirror 52 for easy understanding of the invention in FIG. 6, the shape of the texture 100 is changed between the end portions and the center portion of the reflection mirror 52.

As a more specific shape of this texture, as shown in FIGS. 7(a) and 7(b), in the texture 100 formed to have a saw tooth like cross-section, the pitch (interval) d thereof is preferably set within a range from 0.1 mm at the minimum to 5 mm at the maximum and the angle θ thereof is preferably set within a range from 0 to 90 degrees so as to be adapted to the shape of the free-form curved surface of the reflection mirror 52.

FIG. 8 shows the measurement result obtained by the reflection mirror (concave mirror) 52 provided with the texture 100 described above. Specifically, the "textured" and "non-textured" regions are formed along the right side (A-A cross-section in the drawing) of the reflection mirror 52 at the center of FIG. 8(a), and FIG. 8(b) shows the measured intensity (luminance) of the reflected light from each of the corresponding regions. As is clear from this result, it is possible to reduce the luminance of the reflection to $\frac{1}{10}$ or less by forming an appropriate texture, and it can be confirmed that the formation of the texture is the effective means as a measure for reducing the reflected light entering from the mirror in the displayed video when the backlight is lit.

Further, the texture described above may be provided along the four sides of the peripheral portion of the reflection mirror (concave mirror) 52, but instead, the texture is preferably formed on a portion (region) of the surface of the mirror holder 521, which is a member for holding the reflection mirror 52 thereon, adjacent to the peripheral portion of the reflection mirror. This is because the shape of the free-form curved surface formed on the reflection mirror 52 is set/changed in various ways in accordance with the vehicle in which the HUD 1 is mounted. However, by forming the texture 100 on the surface of the mirror holder 521 instead of the reflection mirror 52, the mirror holders 521 on which various types of textures are formed on the surfaces can be prepared in advance, so that the reflection mirror adapted to the free-form curved surface that is set/changed in various ways can be manufactured more simply and easily by selecting the mirror holder 521 suitable for the shape of the free-form curved surface of the reflection mirror 52 and mounting the reflection mirror 52 on the selected mirror holder 521.

As described in detail above, the HUD according to the present invention provided with the reflection mirror (concave mirror) having the texture structure, which is the means for directing the reflected light in the direction other than the direction toward the driver's eyes (in the line of sight), is more advantageous than the prior art technology because the cost is lower than that of the conventional application of the low-reflection coating and the reduction effect is larger than that of the emboss processing.

In addition, the reflection mirror (concave mirror) having the texture structure described above is particularly suitably applied to the HUD in which the position at which the video is projected on the windshield can be adjusted by adjusting the angle of the reflection mirror as shown in the above embodiment. Namely, it is expected that the possibility of the occurrence of the phenomenon in which backlight light or external light enters and is reflected by the outer peripheral portion of the reflection mirror and the reflected light enters the displayed video increases due to the adjustment of the angle of the reflection mirror. However, by the reflection mirror having the texture structure described above, it is possible to prevent/suppress the reflected light entering the displayed video with the inclusion of the increase in the possibility thereof, so that it is possible to obtain the HUD capable of displaying the high-quality virtual video.

In the foregoing, the present invention has been specifically described based on the embodiment, but it is needless to say that the present invention is not limited to the embodiment described above and various changes can be made within the scope not departing from the gist thereof. For example, the embodiment above has been described in detail in order to make the present invention easily understood, and the present invention is not necessarily limited to the embodiment having all of the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

INDUSTRIAL APPLICABILITY

The present invention can be used for a head up display that projects an image onto a transparent glass plate or the like.

REFERENCE SIGNS LIST

1 . . . HUD, 2 . . . vehicle, 3 . . . windshield, 5 . . . driver (viewpoint), 30 . . . video display device, 31 . . . backlight element (unit), 42 . . . mirror drive unit, 43 . . . distortion correction lens, 50 . . . housing, 52 . . . reflection mirror (concave mirror), 55 . . . optical component holding exterior case, 61, 65 . . . housing, 100 . . . texture, 411 . . . worm wheel, 421 . . . case, 422 . . . electric motor, 423 . . . worm gear, 424 . . . gear, 521 . . . mirror holder

The invention claimed is:

1. A head up display configured to project a video onto a windshield of a transportation, thereby displaying a virtual image related to the video to a driver, the head up display comprising:
a video display device including a light source and a display element and configured to form the video; and
video light projector configured to project and reflect a video light emitted from the video display device on the windshield, thereby displaying the virtual image in front of the transportation,
wherein the video light projector includes a reflection mirror configured to reflect the video light emitted from the video display device to the windshield,
wherein the reflection mirror includes, on its outer peripheral portion, a texture configured to direct a reflected light in a direction different from a direction toward a line of sight of the driver, and
wherein the texture is formed to have a pitch (interval) d within a range from 0.1 mm at the minimum to 5 mm at the maximum and an angle θ of the texture within a range from 0 to 90 degrees.

2. The head up display according to claim 1,
wherein the texture is formed adjacent to the outer peripheral portion of the reflection mirror.

3. The head up display according to claim 1,
wherein an inclination angle of the reflection mirror is adjustable.

4. The head up display according to claim 1,
wherein a shape of the texture at an edge of the reflection mirror and a shape of the texture at a center of the reflection mirror are different.

5. A head up display configured to project a video onto a windshield of a transportation, thereby displaying a virtual image related to the video to a driver, the head up display comprising:
a video display device including a light source and a display element and configured to form the video; and
video light projector configured to project and reflect a video light emitted from the video display device on the windshield, thereby displaying the virtual image in front of the transportation,
wherein the video light projector includes a reflection mirror configured to reflect the video light emitted from the video display device to the windshield,
wherein the reflection mirror includes, on its outer peripheral portion, a texture configured to direct a reflected light in a direction different from a direction toward a line of sight of the driver,
wherein the texture is formed adjacent to the outer peripheral portion of the reflection mirror, and
wherein the texture is formed on a surface of a mirror holder configured to hold the reflection mirror, so as to be located at a position adjacent to the outer peripheral portion of the reflection mirror.

6. The head up display according to claim 5,
wherein an inclination angle of the reflection mirror is adjustable.

7. The head up display according to claim 5,
wherein a shape of the texture at an edge of the reflection mirror and a shape of the texture at a center of the reflection mirror are different.

8. The head up display according to claim 5,
wherein the texture has a serrated cross section.

9. A head up display configured to project a video onto a windshield of a transportation, thereby displaying a virtual image related to the video to a driver, the head up display comprising:
a video display device including a light source and a display element and configured to form the video; and
video light projector configured to project and reflect a video light emitted from the video display device on the windshield, thereby displaying the virtual image in front of the transportation,
wherein the video light projector includes a reflection mirror configured to reflect the video light emitted from the video display device to the windshield,
wherein the reflection mirror includes, on its outer peripheral portion, a texture configured to direct a reflected light in a direction different from a direction toward a line of sight of the driver,
wherein the texture is formed adjacent to the outer peripheral portion of the reflection mirror, and
wherein the reflection mirror has a free-form curved surface and a shape of the texture is changed in accordance with a shape of the free-form curved surface of the reflection mirror.

10. The head up display according to claim 9,
wherein an inclination angle of the reflection mirror is adjustable.

11. The head up display according to claim 9,
wherein a shape of the texture at an edge of the reflection mirror and a shape of the texture at a center of the reflection mirror are different.

12. The head up display according to claim 9,
wherein the texture has a serrated cross section.

* * * * *